US007425007B2

(12) United States Patent
Johannes de Kruijf

(10) Patent No.: US 7,425,007 B2
(45) Date of Patent: Sep. 16, 2008

(54) WHEELCHAIR AND OPERATING MEANS FOR USE IN SUCH A WHEELCHAIR

(75) Inventor: Wilhelmus Petrus Johannes de Kruijf, Enschede (NL)

(73) Assignee: Indes Holding B.V. (NL)

( * ) Notice: Subject to any disclaimer, the term of this patent is extended or adjusted under 35 U.S.C. 154(b) by 0 days.

(21) Appl. No.: 10/563,782

(22) PCT Filed: Jul. 6, 2004

(86) PCT No.: PCT/NL2004/000485

§ 371 (c)(1),
(2), (4) Date: Jun. 29, 2006

(87) PCT Pub. No.: WO2005/002485

PCT Pub. Date: Jan. 13, 2005

(65) Prior Publication Data

US 2007/0063475 A1 Mar. 22, 2007

(30) Foreign Application Priority Data

Jul. 7, 2003 (NL) .................................... 1023836

(51) Int. Cl.
*A61G 5/04* (2006.01)
*B60K 1/00* (2006.01)
*B62D 11/00* (2006.01)

(52) U.S. Cl. .................... 280/250.1; 180/6.5; 180/65.5; 180/907

(58) Field of Classification Search .............. 280/250.1, 280/304.1; 180/6.5, 65.1, 65.5, 907
See application file for complete search history.

(56) References Cited

U.S. PATENT DOCUMENTS

| | | | | |
|---|---|---|---|---|
| 4,422,515 | A | 12/1983 | Loveless | |
| 4,671,524 | A * | 6/1987 | Haubenwallner | 280/212 |
| 5,366,037 | A * | 11/1994 | Richey | 180/65.5 |
| 5,427,193 | A * | 6/1995 | Avakian | 180/65.5 |
| 5,771,988 | A * | 6/1998 | Kikutani et al. | 180/65.5 |
| 5,796,192 | A * | 8/1998 | Riepl | 310/67 R |
| 6,092,615 | A | 7/2000 | Pusch et al. | |
| 6,112,837 | A * | 9/2000 | Kanno et al. | 180/6.5 |
| 6,155,367 | A * | 12/2000 | Alber | 180/65.5 |
| 6,273,212 | B1 | 8/2001 | Husted et al. | |
| 6,276,704 | B1 | 8/2001 | Suiter | |
| 6,371,228 | B1 * | 4/2002 | Husted et al. | 180/65.1 |
| 6,408,961 | B1 * | 6/2002 | Chen | 180/6.5 |
| 6,615,937 | B2 * | 9/2003 | Richey et al. | 180/6.5 |
| 6,840,340 | B2 * | 1/2005 | Inoue et al. | 180/19.3 |

FOREIGN PATENT DOCUMENTS

| | | | |
|---|---|---|---|
| EP | 0861648 | A | 9/1998 |
| WO | WO 02/46023 | A | 6/2002 |

* cited by examiner

*Primary Examiner*—Lesley D. Morris
*Assistant Examiner*—Marc A Scharich
(74) *Attorney, Agent, or Firm*—The Webb Law Firm

(57) ABSTRACT

The invention relates to a wheelchair, including an assembly of a chair unit for a user and a support base supporting the chair unit, wherein the support base includes a number of carrying wheels for carrying the assembly, a drive element connected to the assembly for driving at least one carrying wheel and, an operating element connected to the assembly for operating the drive element. The invention also relates to an operating element for use in such a wheelchair.

17 Claims, 3 Drawing Sheets

WHEELCHAIR AND OPERATING MEANS FOR USE IN SUCH A WHEELCHAIR

BACKGROUND OF THE INVENTION

1) Field of the Invention

The invention relates to a wheelchair, comprising: an assembly of a chair unit for a user and a support base supporting the chair unit, wherein the support base is provided with a number of carrying wheels for carrying the assembly, drive means connected to the assembly for driving at least one carrying wheel, and operating means connected to the assembly for operating the drive means. The invention also relates to operating means for use in such a wheelchair.

2) Description of the Prior Art

Diverse types of wheelchairs are known from the prior art. wheelchairs driven by muscle power are for instance available commercially. In addition, the type of wheelchair stated in the preamble, the so-called motorized wheelchair, is also commercially known, wherein the drive power is produced by a different type of energy source, in particular an (electro) mechanical motor. In the known motorized wheelchairs the operating means are formed by a joystick which is arranged in a position for the user, usually on a plate connected to the support base. Such a joystick is adapted for operation with only a single hand. In addition to the advantage that the motorized wheelchair can be operated in relatively simple manner, the motorized wheelchair also has multiple drawbacks. A first drawback of the known motorized wheelchair is that the wheelchair is relatively difficult to operate by persons who are relatively weak physically, since a relatively unnatural posture must generally be assumed during operation of the joystick. Particularly in the case that long distances have to be covered in the motorized wheelchair, considerable fatigue and/or physical problems (such as for instance back or arm problems) can occur in the user. The arms of the user are furthermore not equally loaded—since the joystick can only be operated by a single hand—which can result (in the long term) in physical problems. It is noted in addition that mounting of the joystick (on the plate) is generally relatively expensive and relatively complex. There is thus for each type of motorized wheelchair an individual set of fixing means for mounting the joystick on the support base, which is relatively time-consuming.

The invention has for its object, while retaining advantage of the prior art, to provide an improved motorized wheelchair with which the above stated drawbacks can be prevented.

SUMMARY OF THE INVENTION

The invention provides for this purpose a wheelchair of the type stated in the preamble, characterized in that the operating means are positioned at least partially laterally relative to the chair unit. A positioning of the operating means to the side of the chair unit is relatively favourable, since the user can assume a natural posture while controlling or operating the wheelchair, which can prevent or at least counter (considerable) fatigue and/or (more serious) physical problems. Since the wheelchair according to the invention is fully motorized, no significant muscular power need be exerted by the user to transport him/herself in the wheelchair. The wheelchair according to the invention is therefore also relatively simple and light to operate. An additional advantage of the wheelchair according to the invention is that the aesthetic appearance very closely resembles the appearance of the known, manually driven wheelchair, wherein the posture of the user in the wheelchair moreover remains substantially unchanged in both types. Such similarities in appearance and posture generally have a positive influence on the user of a motorized wheelchair. Particularly when the user of a manually operated wheelchair switches to a motorized wheelchair according to the invention, a possible psychological barrier to such a transition will be lowered. Lowering of the psychological barrier will generally result in a quicker acceptance of the user of the transition from a manually driven wheelchair to a (fully) motorized wheelchair. In addition to the psychological aspect, there is usually also a cognitive aspect which plays a part for the user. The operating means of the wheelchair according to the invention are positioned such that a user can learn how to operate the wheelchair relatively quickly and independently. Such a cognitive aspect generally also contributes to the more rapid acceptance of the wheelchair by the user. It is noted that the chair unit must be broadly interpreted. Support of the user in a prone position can thus also be realized by the chair unit. The chair unit is not therefore limited to a unit in which the user can only assume a sitting position.

The operating means preferably comprise at least one operating member for the user, wherein the operating member is positioned at least partially laterally relative to the chair unit. In particular, the operating member serves as handgrip for the user adjacently of the chair unit and can be designed in very diverse ways. It is thus possible for instance to envisage embodying the operating member as a handle or as a conventional push rim placed adjacently of a carrying wheel. It is however noted here that the push rim does not co-rotate with the carrying wheels during motorized transport of the wheelchair, but that the push rim is connected more or less rigidly to the assembly. It is also possible to envisage integrating the operating member into an armrest of the wheelchair, whereby the natural posture of the user can be further stabilized. In a particular preferred embodiment, the operating means comprise two operating members positioned on either side of the chair unit. It is thus possible to perform the control of the drive means with two hands. An advantage hereof is that both arms of the user are substantially equally loaded, which can prevent or at least counter physical problems for instance resulting from overloading of an arm. An additional advantage of such a dual operation is that the wheelchair can be controlled with relatively high accuracy. In a further particular preferred embodiment, the operating member is adapted to undergo one or more changes in orientation. Such a change in orientation can be very diverse and may for instance include slight pivoting or rotating of (a part of) the operating means, whereby the drive means can be activated. In a particular preferred embodiment, the operating member is adapted to undergo a first change in orientation for regulating the displacement speed of the wheelchair, and a second change in orientation for manoeuvring of the wheelchair. Manoeuvring is here particularly understood to mean rotation of the wheelchair, which can be realized by providing the drive wheels with a differing speed. The or each operating member is preferably displaceable between at least two extreme positions. The two extreme positions can for instance correspond with displacing of the wheelchair forward and backward at maximum speed, wherein the operating member thus functions as a type of accelerator handle. In another preferred embodiment the operating member takes an at least substantially tubular form and is axially rotatable through a determined angle of rotation. It is possible here to envisage the operating means comprising at least one sensor connected to the assembly for sensing the change in orientation of the operating member. The signal sensed by the sensor can be further transmitted to a control unit for operating the drive means.

In another preferred embodiment the operating means are adapted for wireless communication with the drive means. For this purpose the operating means can comprise one or more remote controls for (de)activating the drive means. Communication can take place via infrared or radio frequencies. It is possible to economize on a number of mechanical components by applying wireless communication in the wheelchair according to the invention, which generally results in a mechanically relatively simple, motorized wheelchair with a relatively low mass.

In yet another preferred embodiment, the drive means are adapted for independent driving of a plurality of carrying wheels, wherein the operating members are each adapted to control a determined driven carrying wheel. Each carrying wheel or each set of mutually coupled carrying wheels can thus be operated by a single operating member. An opposite carrying wheel or set of carrying wheels can herein be operated by an opposite operating member.

The operating means are preferably connected to a wheel shaft received in a hub of at least one carrying wheel. The operating means can thus be coupled to the assembly in efficient manner without the operating means co-rotating with the carrying wheels during forward travel of the wheelchair. The operating means can herein be directly coupled to a motor unit forming part of the drive means. The motor unit is in that case also coupled to at least one carrying wheel. In a particular preferred embodiment, the motor unit is at least substantially arranged in a hub of a carrying wheel for driving, and can for instance be formed by a direct drive motor. In a direct drive motor the hub is driven directly by the (electric) motor without the interposing of other mechanical components.

In a preferred embodiment at least a part of the operating means is positioned on a side of at least one carrying wheel remote from the chair unit. The operating means are positioned on an external side of the wheelchair and can thus be reached relatively easily by the user. It is here also possible to envisage the operating means enclosing the assembly on two sides.

In another preferred embodiment the operating means can be locked in at least one position. It is thus possible to fix the speed of the wheelchair during standstill or transport. Such a locking thus prevents fatigue of the user, particularly during displacement over relatively long distances. It is also possible to envisage locking the operating means during standstill, whereby unintended operation of the wheelchair by the user can be prevented. It is also possible to envisage coupling the operating means to unlocking means, whereby the operating means can only be used to operate the wheelchair after unlocking. Undesired operation of the wheelchair can thus also be prevented. The unlocking means can herein be integrated into a part of the operating means, in particular the operating member.

In a final preferred embodiment, the operating means are releasably connected to the assembly. It is thus possible in relatively simple manner to adjust the operating means to the user and/or replace them during for instance maintenance or repair work on the operating means and/or the assembly. The operating means are here then provided with coupling means adapted for co-action with counter-coupling means forming part of the assembly, in particular of the wheel shaft.

The invention also relates to operating means for use in such a wheelchair.

BRIEF DESCRIPTION OF THE DRAWINGS

The invention will be further elucidated on the basis of non-limitative exemplary embodiments shown in the following figures. Herein.

DETAILED DESCRIPTION OF THE PREFERRED EMBODIMENTS

Figure 1:
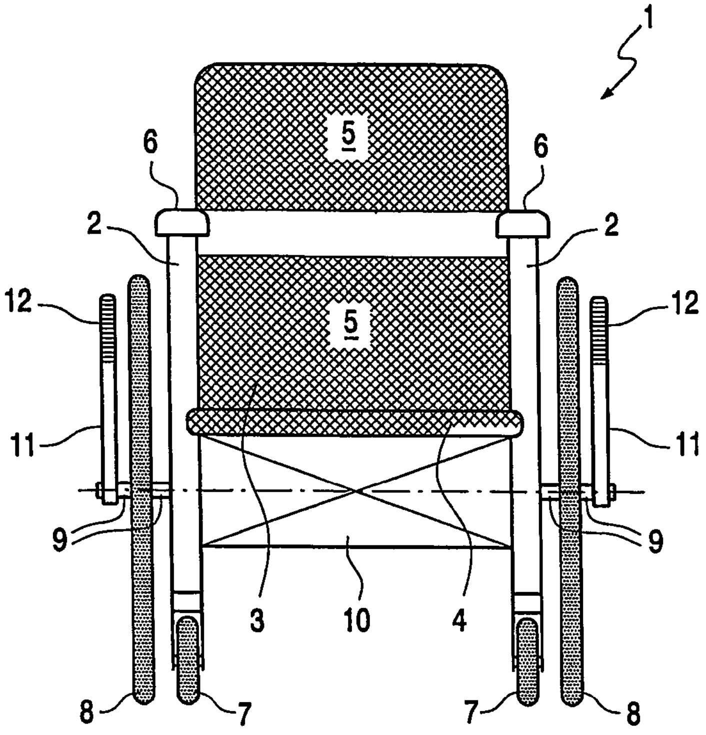
FIG. 1 shows a front view of a first preferred embodiment of a wheelchair according to the invention.

FIG. 1 shows a front view of a first preferred embodiment of a wheelchair 1 according to the invention. Wheelchair 1 comprises a frame 2 and a chair unit 3 connected to the frame. Chair unit 3 is herein provided with a seat 4, two back supports 5 and two armrests 6. The frame is connected to two small swivel wheels 7, which swivel wheels 7 are rotatable about a horizontal axis and a vertical axis. The frame is also connected to two drive wheels 8 positioned adjacently of chair unit 3. Drive wheels 8 are coupled by means of a wheel shaft 9 to a motor unit 10 for motorized driving of drive wheels 8. Motor unit 10 can herein be operated by means of two operating handles 11 connected pivotally to wheel shaft 9. In a situation of rest the operating handles 11 protrude in a substantially vertical direction relative to wheel shaft 9. Operating handles 11 are here oriented such that a user of wheelchair 1 can reach and pivot the operating handles 11 relatively easily from a natural position and can thus operate wheelchair 1 relatively easily. Operating handles 11 are preferably pivotable substantially parallel to drive wheels 8. In the shown exemplary embodiment each operating handle 11 is adapted to drive only an adjacent drive wheel 8. The user can thus not only regulate the speed of wheelchair 1 by adjusting the degree of pivoting of operating handles 11, but a change in direction of the wheelchair 1 can also be realized by pivoting one operating handle 11 further or less far than the other operating handle 11. Operating handles 11 are each provided with a handgrip 12 in order to facilitate operation of handles 11 by a user. The maximum pivot of operating handles 11 is preferably bounded. By embodying motorized wheelchair 1 in the shown manner a user can control the wheelchair relatively easily and in a relatively natural posture, wherein both arms of the user are loaded only lightly though (substantially) uniformly. (More serious) physical problems, such as for instance severe fatigue or arm or back problems, can hereby be prevented or at least countered.

Figure 2:
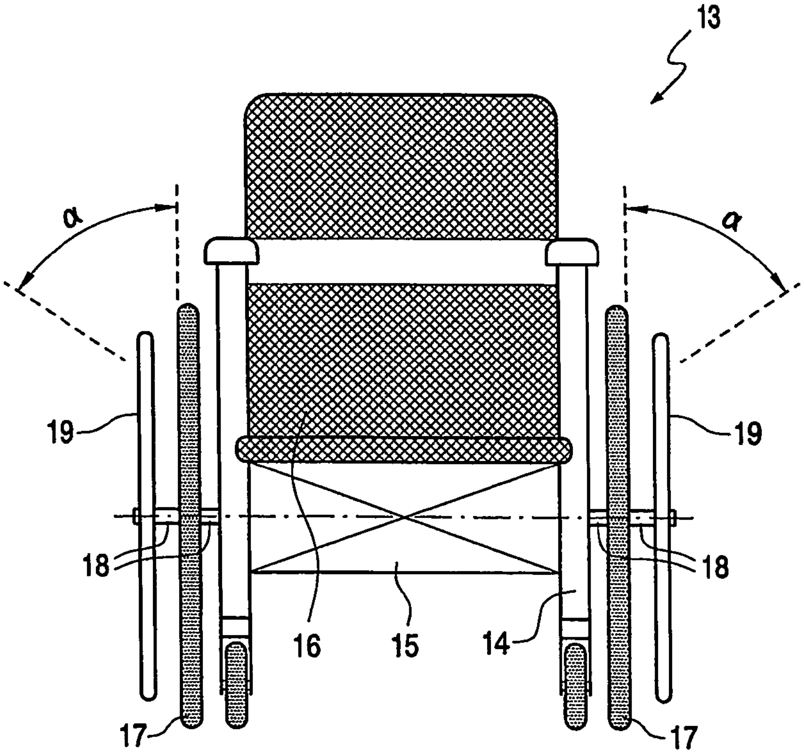
FIG. 2 shows a front view of a second preferred embodiment of a wheelchair according to the invention.

FIG. 2 shows a front view of a second preferred embodiment of a wheelchair 13 according to the invention. The construction of wheelchair 13 closely resembles the construction of the wheelchair 1 shown in FIG. 1. In FIG. 2 the wheelchair is likewise provided with a motor unit 15 connected to support base 14 for driving two drive wheels 17 which are positioned laterally relative to a chair unit 16 connected to the support base. Motor unit 15 can now be operated by means of two push rims 19 pivotally connected to a wheel shaft 18 of drive wheels 17. The speed of wheelchair 13 can be regulated by varying the degree of pivoting of push rims 19. Pivoting of push rims 19 takes place in a direction toward chair unit 16 or away from chair unit 16. The maximum pivot angle ∀ enclosed by the two extreme positions of each push rim 19 is bounded and is now shown (schematically) in FIG. 2. Push rims 19 can be locked in the shown position, wherein push rims 19 are oriented substantially parallel to drive wheels 17, whereby manual driving is also made possible in this case. In determined situations, such as for instance indoors, a manual drive is usually recommended over a motorized drive. Motor unit 15 can be provided with two direct current direct drive motors (not shown) for direct (separate) driving of drive wheels 17. The wheelchair 13 shown in FIG. 2 also has the same advantages as wheelchair 1 shown in FIG. 1.

Figure 3:
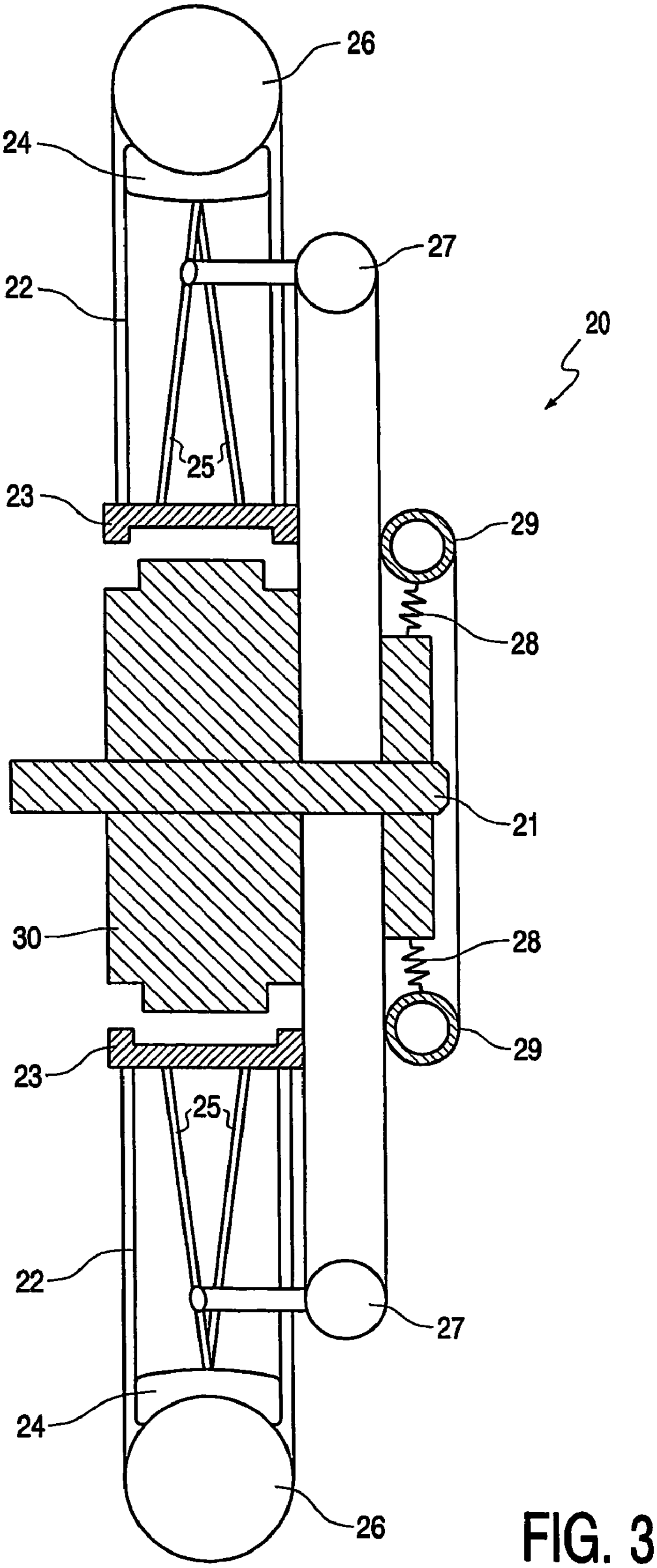
FIG. 3 shows a detail view of a part of a third preferred embodiment of a wheelchair according to the invention.

FIG. 3 shows a detail view of a-part of a third preferred embodiment of a wheelchair 20 according to the invention. The shown part of wheelchair 20 comprises a drive wheel 22 (corresponding to drive wheels 8, 17 of wheelchairs 1, 13 of FIGS. 1 and 2) rotatable about a wheel shaft 21. Drive wheel 22 is here constructed from a hub 23 positioned round wheel shaft 21 and a rim 24 positioned coaxially to hub 23, wherein hub 23 and rim 24 are mutually connected by spokes 25. Arranged around rim 24 is a conventional pneumatic tyre 26. Drive wheel 22 is also provided with a drive push rim 27 connected to spokes 25 for manual—instead of motorized—driving of wheelchair 20. Wheelchair 20 is further provided with an operating ring 29 connected to wheel shaft 21 via a number of springs 28 for the purpose of operating a motor 30 connected to wheel shaft 21. Motor 30, of which only a stator is shown here, is arranged between wheel shaft 21 and hub 23. The relative rotation of operating ring 29 can be detected and serves as measure for the power to be transmitted by motor 30 to drive wheel 22. The speed, both in forward and backward direction, can thus be regulated in relatively simple manner.

Figure 4:
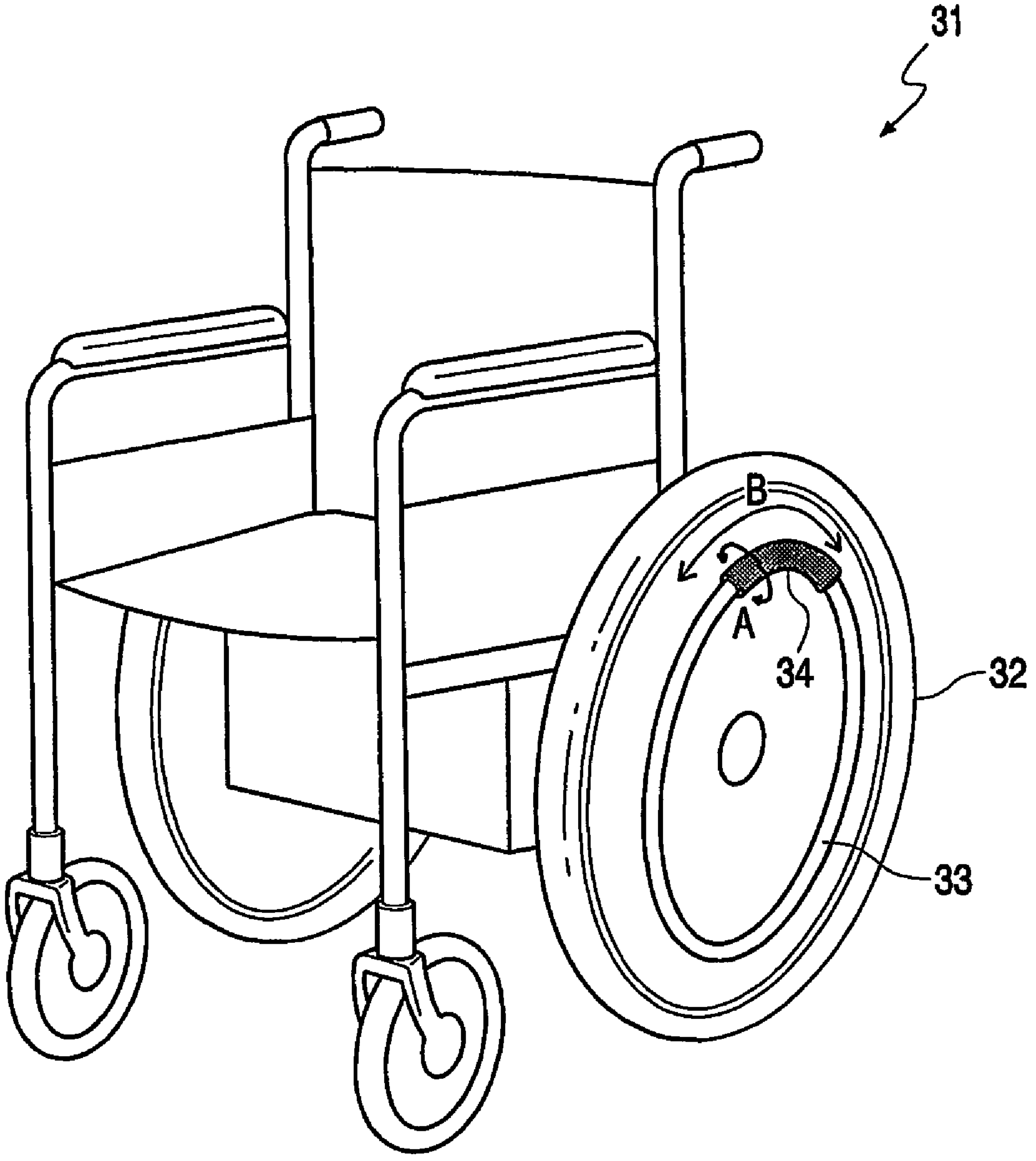
FIG. 4 shows a perspective schematic view of a fourth preferred embodiment of a wheelchair according to the invention.

FIG. 4 shows a schematic perspective view of a fourth preferred embodiment of a wheelchair 31 according to the invention. Here only a single drive wheel 32 of wheelchair 31 is provided with a push rim 33. Push rim 33 is herein provided with a handgrip 34 arranged round push rim 33. Handgrip 34 is axially rotatable (A) and displaceable along push rim 33 (B), as shown respectively by arrows A and B. A motor (not shown) connected to drive wheel 32 can be operated by means of handgrip 34. Because a twofold change in orientation of handgrip 34 is possible, a user can not only regulate the speed of wheelchair 31 by displacing handgrip 34 in direction B, but it is also possible to orient wheelchair 31 in a determined direction by rotating handgrip 34 axially in direction A. Wheelchair 31 can thus be operated in relatively simple yet efficient manner using only one hand. This can be particularly advantageous for users who are for instance paralysed on one side, or wherein one arm is incapacitated temporarily or otherwise. Wheelchair 31 is also provided with a conventional push rim 35 for manual instead of motorized driving of wheelchair 31.

It will be apparent that the invention is not limited to the exemplary embodiments shown and described here, but that within the scope of the appended claims a large number of variants are possible which will be self-evident for a skilled person in this field.

The invention claimed is:

1. A wheelchair, comprising:

an assembly of a chair unit for a user and a support base supporting the chair unit, wherein the support base is provided with a number of carrying wheels for carrying the assembly, carrying wheel drive means connected to said assembly, said drive means being provided with at least one motor unit coupled to at least one of said carrying wheels, said motor unit at least substantially being arranged within a hub of said at least one carrying wheel, and operating means for operating the drive means, wherein the operating means are positioned at least partially laterally relative to the chair unit, and the operating means are directly connected to a wheel shaft received in the hub of said at least one carrying wheel, wherein said operating means controls said at least one motor unit.

2. The wheelchair as claimed in claim 1, wherein the operating means comprise at least one operating member for the user, wherein the operating member is positioned at least partially laterally relative to the chair unit.

3. The wheelchair as claimed in claim 2, wherein the operating means comprise two operating members positioned on either side of the chair unit.

4. The wheelchair as claimed in claim 2, wherein the at least one operating member is adapted to undergo at least one change in orientation.

5. The wheelchair as claimed in claim 4, wherein the at least one operating member is adapted to undergo a first change in orientation for regulating a displacement speed of the wheelchair, and a second change in orientation for maneuvering of the wheelchair.

6. The wheelchair as claimed in claim 4, wherein the at least one operating member is displaceable between at least two extreme positions.

7. The wheelchair as claimed in claim 4, wherein the at least one operating member takes an at least substantially tubular form and is axially rotatable through a determined angle of rotation.

8. The wheelchair as claimed in claim 4, wherein the operating means further comprise at least one sensor connected to the assembly for sensing said at least one change in orientation of the at least one operating member.

9. The wheelchair as claimed in claim 1, wherein the operating means are adapted for wireless communication with the drive means.

10. The wheelchair as claimed in claim 1, wherein the operating means comprise a plurality of operating members, wherein the drive means are adapted for independent driving of a plurality of carrying wheels, and the operating members are each adapted to control a determined driven carrying wheel.

11. The wheelchair as claimed in claim 1, wherein at least a part of the operating means is positioned on a side of at least one carrying wheel remote from the chair unit.

12. The wheelchair as claimed in claim 1, wherein the operating means can be locked in at least one position.

13. The wheelchair as claimed in claim 1, wherein the operating means are releasably connected to the assembly.

14. A wheelchair, comprising:

an assembly of a chair unit for a user and a support base supporting the chair unit, wherein the support base is provided with a number of carrying wheels for carrying the assembly, drive means connected to the assembly for driving at least one carrying wheel, said drive means being provided with at least one motor unit coupled to a carrying wheel, said motor unit at least substantially being arranged within a hub of said carrying wheel for driving, and operating means for operating the drive means, wherein the operating means are positioned at least partially laterally relative to the chair unit, and the operating means are directly connected to a wheel shaft received in the hub of said carrying wheel, wherein the operating means controls said at least one motor unit, wherein the operating means comprise at least one operating member for the user, wherein the at least one operating member is positioned at least partially laterally relative to the chair unit, and wherein the at least one operating member is adapted to undergo a first change in orientation for regulating a displacement speed of the wheelchair, and a second change in orientation for maneuvering of the wheelchair.

15. A wheelchair, comprising:

an assembly of a chair unit for a user and a support base supporting the chair unit, wherein the support base is provided with a number of carrying wheels for carrying the assembly, drive means connected to the assembly for driving at least one carrying wheel, said drive means being provided with at least one motor unit coupled to a carrying wheel, said motor unit at least substantially being arranged within a hub of said carrying wheel for driving, and operating means for operating the drive means, wherein the operating means are positioned at least partially laterally relative to the chair unit, and the operating means are directly connected to a wheel shaft received in the hub of said carrying wheel, wherein the operating means controls said at least one motor unit, wherein the operating means comprise at least one operating member for the user, wherein the at least one operating member is positioned at least partially laterally relative to the chair unit, wherein the at least one operating member is adapted to undergo at least one change in orientation, and wherein the at least one operating member is displaceable between at least two extreme positions.

16. A wheelchair, comprising:

an assembly of a chair unit for a user and a support base supporting the chair unit, wherein the support base is provided with a number of carrying wheels for carrying the assembly, drive means connected to the assembly for driving at least one carrying wheel, said drive means being provided with at least one motor unit coupled to a carrying wheel, said motor unit at least substantially being arranged within a hub of said carrying wheel for driving, and operating means for operating the drive means, wherein the operating means are positioned at least partially laterally relative to the chair unit, and the operating means are directly connected to a wheel shaft received in the hub of said carrying wheel, wherein the operating means controls said at least one motor unit, and wherein the operating means are adapted for wireless communication with the drive means.

17. A wheelchair, comprising:

an assembly of a chair unit for a user and a support base supporting the chair unit, wherein the support base is provided with a number of carrying wheels for carrying the assembly, carrying wheel drive means connected to said assembly, said drive means being provided with at least one motor unit coupled to at least one of said carrying wheels, said motor unit at least substantially being arranged within a hub of said at least one carrying wheel, and operating means for operating the drive means, wherein the operating means are positioned at least partially laterally relative to the chair unit, and the operating means are directly connected to and at least partially encircle a wheel shaft received in the hub of said at least one carrying wheel.

* * * * *